United States Patent [19]
Cho

[11] Patent Number: 5,515,071
[45] Date of Patent: May 7, 1996

[54] FUNCTION DISPLAY CIRCUIT AND METHOD THEREOF IN AN ELECTRONIC SYSTEM

[75] Inventor: Ki-Young Cho, Seoul, Rep. of Korea

[73] Assignee: SamSung Electronics Co., Ltd., Kyungki-do, Rep. of Korea

[21] Appl. No.: 524,917

[22] Filed: May 18, 1990

[30] Foreign Application Priority Data

Nov. 13, 1989 [KR] Rep. of Korea ............... 89-16423

[51] Int. Cl.[6] .......................................... G09G 3/20
[52] U.S. Cl. .................... 345/30; 345/39; 340/815.4; 340/815.45
[58] Field of Search ................ 340/815.01, 815.02, 340/815.03, 815.10, 517, 524, 525, 715, 791, 762, 765, 782, 774, 815.4, 815.45; 345/30, 1, 39, 38

[56] References Cited

U.S. PATENT DOCUMENTS 4,293,843  10/1981  Bertoloni .................. 340/815.01
4,381,493  4/1983   Mason ..................... 340/815.01
4,509,046  4/1985   Yamada .................... 340/815.02
4,725,830  2/1988   Kawai ..................... 340/724

*Primary Examiner*—Ulysses Weldon
*Assistant Examiner*—Matthew Luu
*Attorney, Agent, or Firm*—Robert E. Bushnell

[57] ABSTRACT

In an electronic system having a plurality of function parts, a function display circuit comprising a switching part to select a desired function part, a first display part to display an operating function part, a second display part to display a function of the operating function part and logic control means including a first and a second MICOM parts, said second MICOM part being controlled by the first MICOM part to drive the first and the second display parts respectively, and a function display method comprising a function decision process to decide a switching state, a function stop process to stop driving each of the first and the second display parts for an unselected function part, and a function display process to display an operating state and a function of a selected function part.

12 Claims, 2 Drawing Sheets

5,515,071

FUNCTION DISPLAY CIRCUIT AND METHOD THEREOF IN AN ELECTRONIC SYSTEM

BACKGROUND OF THE INVENTION

This invention relates to a function display of an electronic system and more particularly to a function display circuit and a method therefor in an electronic system with a plurality of function parts, which displays a function and the operating state of a working part using a LCD (Liquid Crystal Display) and a multicolored LED (Light Emitting Diode).

It is necessary to display the state of working parts by using an LCD and an LED in electronic systems such as a component sound system and/or a cassette tape recorder having a plurality function parts. In conventional electronic systems, an individual LCD and/or LED is provided for each function part so that the cost of the electronic system is increased and in the case of displaying the state of the working parts by using a single display element, a user can't distinguish the working part from various function parts.

SUMMARY OF THE INVENTION

It is an object of the present invention to provide a function display circuit for displaying the state of a working part by using a LCD and a multicolored LED so that the user can easily distinguish a current working part by means of a displayed color.

Another object of the present invention is to provide a method for displaying a function employed in the function display circuit.

The present invention comprises a function display circuit in an electronic system having a plurality of function parts, comprising;

a switching part for operating a desired function part;

a first display part for displaying an operating function part;

a second display part for displaying a function of the operating function part; and logic control means including a first microcomputer MICOM part and a second MICOM part, said first MICOM part controlling said second MICOM part according to a switching of said switching part so as to apply an operation signal to said first display part and to provide a function display signal to said second display part.

In addition, the method for displaying a function comprises the following processes:

a function decision process including a first decision step for deciding that the switching state of the switching part is for a first function part and a second decision step for deciding that the switching state of the switching part is for a second or a third function part;

a function stop process for stopping the driving of the first and the second display parts showing an operating state and the function of an unselected function part by the switching part; and a function display process for displaying the operating state and the function of a selected function part on the first and the second display parts, respectively.

BRIEF DESCRIPTION OF THE DRAWINGS

These and other objects, features, and advantages of the present invention will become more apparent from the following description for the preferred embodiments taken in conjunction with the accompanying drawings, in which.

DETAILED DESCRIPTION OF THE INVENTION

The present invention will be now described in more detail with reference to the accompanying drawings.

Figure 1:
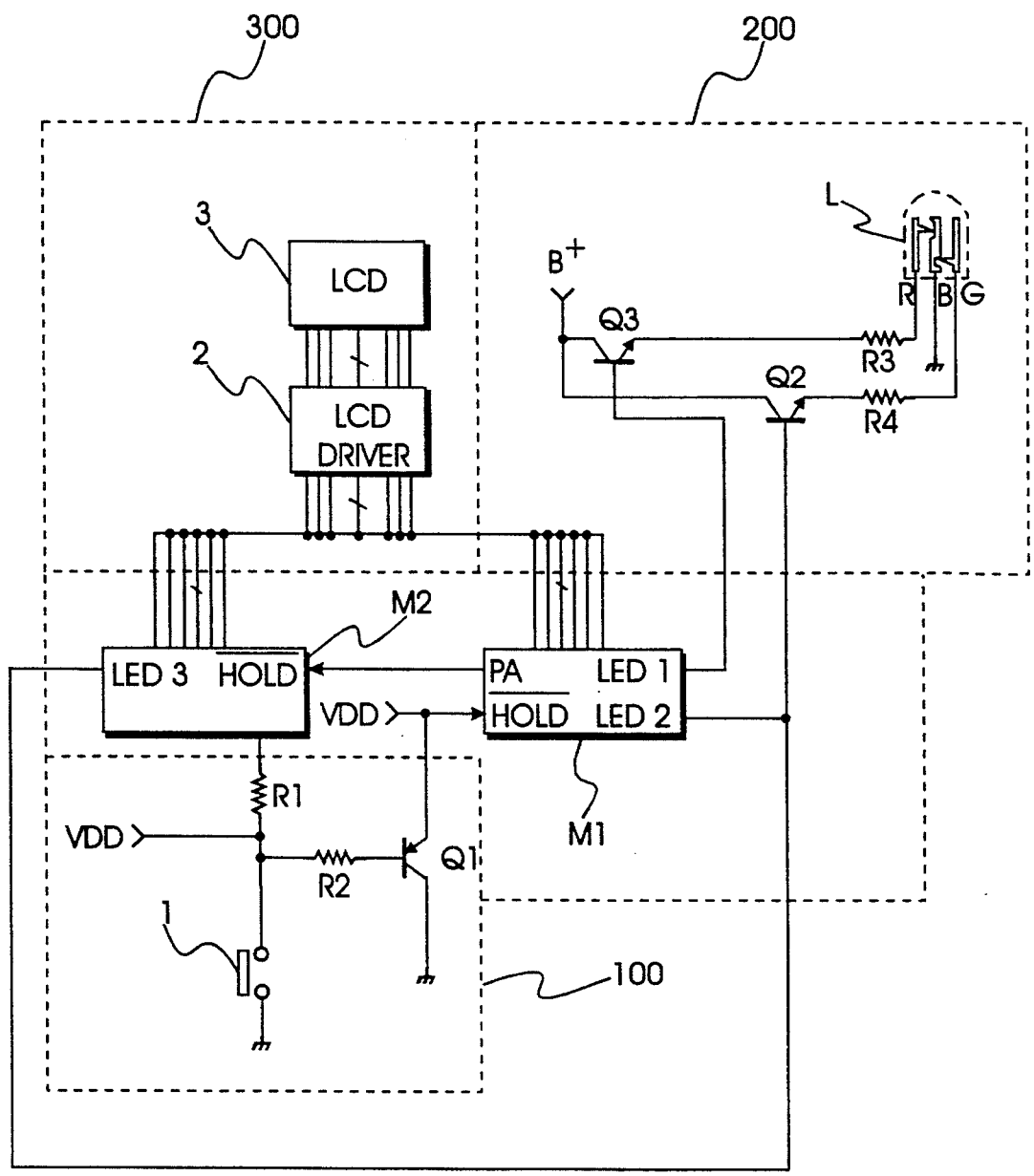
FIG. 1 is a function display circuit of an electronic systems according to the present invention.

FIG. 1 shows a function display circuit of an electronic system. In FIG. 1, a switching part 100 for selecting a desired function part comprises a switch 1 connected between a switching transistor Q1 and a power supply source VDD for controlling the transistor Q1 to be driven for a compact disk.

Logic control means 400 comprises a first MICOM M1 for a tuner and a timer operating according to a switching state of the transistor Q1 and a second MICOM M2 for the compact disk operating according to a control signal of the first MICOM M1 to provide the function display signal and the operation control signal by driving either the first MICOM M1 or the second MICOM M2 according to the control of the switching part 100.

A first display part 200 for displaying an operating state of a function part by the control signal of the logic control means 400 comprises a switching transistor Q3 driven by a control signal of an output terminal LED 1 of the first MICOM M1 which is connected to a terminal R of a 3-color LED L to emit red color. And, a transistor Q2 driven by an output signal of each output terminal LED2 and LED3 of the first and the second MICOM M1 and M2 which is connected to the terminal G of the 3-color LED L to emit green color. A second display part 300 for displaying a function of a current working part by the control signal of the logic control means comprises an LCD 3 and a LCD driver 2 for providing display data on the LCD 3 according to the control signals of the first and the second MICOM M1 and M2.

Figure 2:
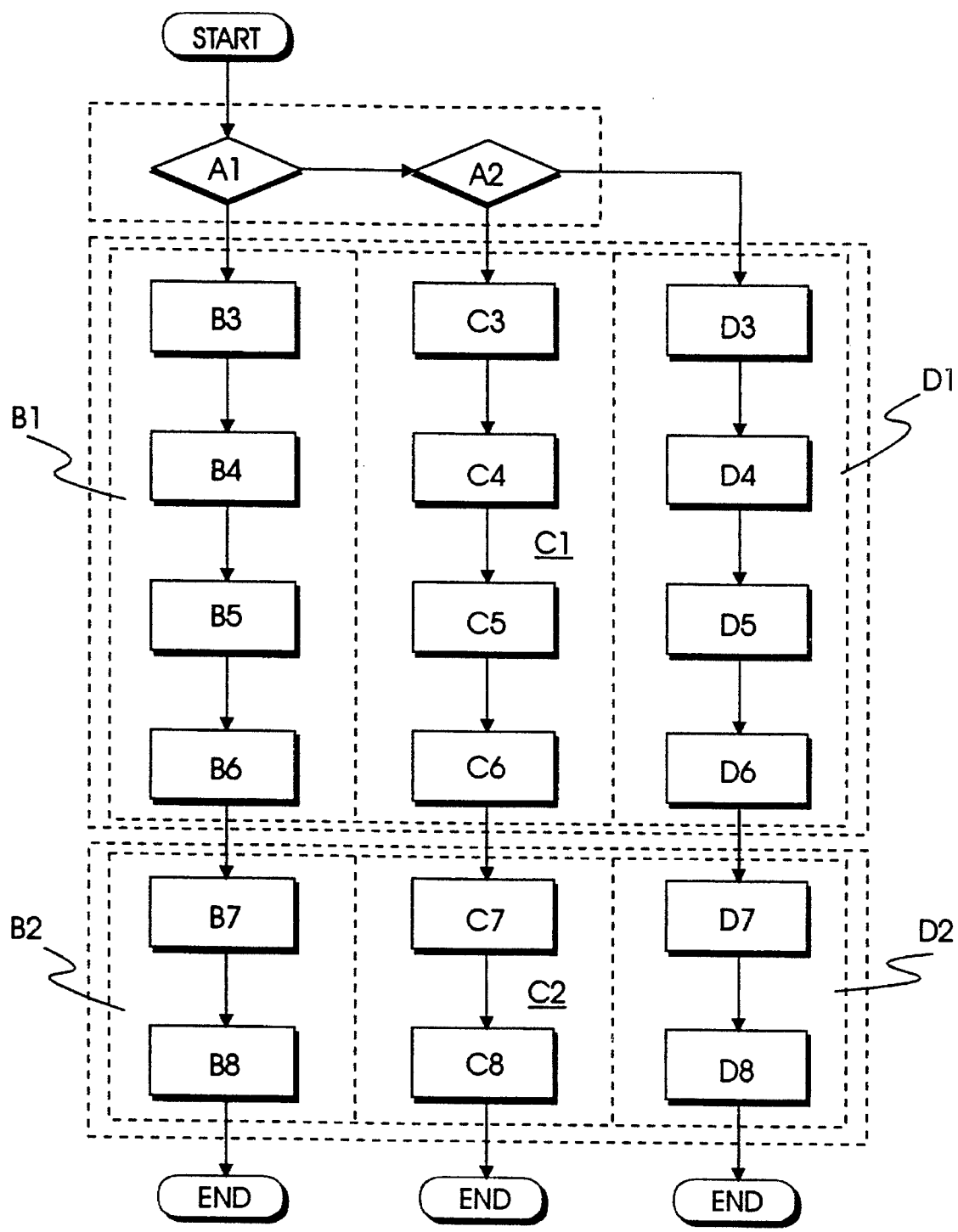
FIG. 2 is a flowchart showing a method for displaying a function of the electronic system.

FIG. 2 is a flowchart showing a method of displaying a function in the function display circuit shown in FIG. 1.

The decision process for checking an applied signal from the switching part 100 to determine the intended function and operation display among the first, the second, or the third function parts, comprises a decision step A1 to decide whether the signal is for the first function part or not and a decision step A2 to decide whether the signal is for the second function part or not when the decided signal at the step A1 is not for the first function part. For example, the first function part is a tuner, the second function part is a timer, and the third function part is a compact disk.

Next, the function stop process for stopping the operation of the first and the second function display parts 200 and 300 comprises a first function stop routine B1 for stopping a display of the operating state and the function of the second and the third function part unselected at the step A1, the second function stop routine C1 for stopping a display of those of the first and the third function parts unselected at the step A2, and the third function stop routine D1 for stopping the display of those of the first and the second function parts unselected at the step A2.

The function stop routine B1 comprises a step B3 for stopping the operation of the second display part 300 displaying the function of the second or the third function part, a step B4 for putting the second MICOM M2 in a standby state, and a step B5 for stopping the driving of the first display part 200 displaying the operating state of the second or the third function part. Also, the first function stop routine B1 includes a step B6 for stopping the power supply of the second MICOM M2.

On the other hand, the second and the third function stop routines C1 and D1 are carried out through the same steps as the first routine B1 to stop driving each of the first display part 200 and the second display part 300 displaying the operation and the function of an unselected function part at the switching part 100.

After the function stop process, the function display process for displaying an operating state and a function of a selected function part by using the first and the second display parts comprises a first function display routine B2 for displaying the function and the operating state of the first function part, a second function display routine C2 for displaying those of the second function part, and a third function display routine D2 for displaying those of the third functional part. The first function display routine B2 comprises a step B7 for displaying the operating state of the first functional part selected by the switching part 100 at the first display part 200 after the power supply control step B6 and a step B8 for displaying the function of the first function part at the second display part 300. Similarly, the second and the third function display routines C2 and D2 are carried out through the same steps as the first routine B2, respectively.

In the present invention employing the circuit and the method, when the tuner switch is pressed, the first MICOM M1 distinguishes the depressed switch between the tuner and the timer switches to carry out the function stop routine B1, while if the timer switch is pressed the MICOM M1 carries out the decision step A2.

In case that the tuner switch is pressed, the first MICOM M1 carries out the step B3 for stopping the function of the second function part, that is the first MICOM M1 provides the control signal to the LCD driver 2 so as to stop applying the display data applied to the LCD 3.

After carrying out the step B3, the step B4 for putting the second MICOM M2 in the standby state is carried out, in such a way that a low level signal is provided through the terminal PA to turn off the first display part 200 showing the operating state of the compact disk function part or the timer function part. And the first MICOM M1 provides the low level signal through the terminals LED 1 and LED 2 in order to turn off the transistors Q2 and Q3 included in the first display part 200 so that the 3-color LED L is turned off in the step B5. After carrying out the step B5, the first MICOM M1 carries out the step B6 for stopping the power supply applied to the second MICOM M2 for the compact disk.

The first MICOM M1 completing the function stop routine B1 provides the low and the high level signal from each terminal LED1 and LED2 to each transistor Q2 and Q3 to display the function of the tuner respectively so that the transistor Q2 is turned off, while the transistor Q3 is turned on. Accordingly, the voltage is applied to the terminal R of the 3-color LED L, while it is not applied to the terminal G of the 3-color LED, so that the LED L emits the red light showing the operating state of the tuner thereby to finish the first display part driving step B7. And the first MICOM M1 carries out the step B8 for displaying the function of the tuner on the LCD 3 to provide the function display signals according to the operation of the tuner to the LCD driver 2 in order to display the function of the tuner on the LCD3, and the first function display routine is finished.

On the other hand, when the timer switch is pressed, the decision step A2 is followed after the decision step A1 to distinguish whether the timer switch is pressed or not since the tuner switch is not pressed, and the first MICOM M1 carries out the second function stop routine C1 as the routine B1 so that the driving of the first and the third display parts 200 and 300, which is showing the operating state of the tuner of the compact disk, is stopped and the power supply of the second MICOM M2 for the compact disk is also stopped.

After carrying out the routine C1, the first MICOM M1 provides the high level signals through the terminals LED 1 and LED 2 to turn on the transistors Q2 and Q3. Thus, the voltage is applied to the terminal R and G of the 3-color LED L so that the LED emits both of red and green lights showing the operating state of the timer thereby to carry out step C7 for driving the second display part. Then the first MICOM M1 carries out a step C8 for driving the second display part to provide the function display signal according to the operation of the timer to the LCD driver 2 so as to display the function of the timer on the LCD3 and the second function display routine C1 is finished.

In addition, when the switch 1 in the switching part 100 is pressed to select the operation of the compact disk, the low level voltage is applied to the base of the transistor Q1, thereby turning on the transistor Q1. Thus, the low level signal is applied to the terminal $\overline{HOLD}$ of the MICOM M1 and the first MICOM M1 distinguishes it through the decision steps A1 and A2 that neither the tuner nor the timer is selected, so the first MICOM M1 carries out a step D3 for displaying nothing on the LCD 3 by providing the control signal from the LCD driver 2. Also, the first MICOM M1 becomes the standby state after carrying out a step D4 and providing the low level signal through both terminals LED 1 and LED 2 to turn off the transistors Q2 and Q3. Thus, no voltage is applied to the terminals R and G of the 3-color LED L so that the LED L does not emit any light in a step D5. Next, the first MICOM M1 carries out a step D6 for stopping the power supply of the first MICOM M1 and providing the high level signal to the terminal $\overline{HOLD}$ of the second MICOM M2 for the compact disk to drive the second MICOM M2.

After the third function stop routine D1, the driving of the first MICOM M1 is stopped and the second MICOM M2, which receives the operation starting signal from the first MICOM, turns on the switching transistor Q2 by providing the high level signal through the terminal LED 3 to display the operating state of the second MICOM M2 for the compact disk. Thus, the voltage is applied to the terminal G of the 3-color LED L through the transistor Q2 so that the 3-color LED L emits the green light by carrying out a step D7 for displaying the operating state of the compact disk. After the step D7, the second MICOM M2 applies the function display signal according to the operation of the compact disk to the LCD driver 2, and the LCD driver 2 provides the data to the LCD 3 so that the LCD 3 displays the function of the compact disk in the step D8.

When the switch in the switching part 100 is driven, the logic control means check which function part is selected to stop driving each of the first and the second display parts 200 and 300 displaying the function and the operating state of the unselected function part. Next, according to the selected function part, its function is displayed at the second display part 300 and the selected function part is displayed by the emitting the 3-color LED L in the first display part 200.

As mentioned hereinabove, the function display circuit and its method according to the present invention make it easy to find the operation states of various function parts since the working function part is displayed by changing the color emitted from the multicolored LED according to each working function part.

The invention is in no way limited to the embodiment described hereinabove. Various modifications and variations of the disclosed embodiment as well as other embodiments of the invention will become apparent to persons skilled in the art upon reference to the description of the invention. It is therefore contemplated that the appended claims will cover any such modifications or embodiments as fall within the true scope of the invention.

What is claimed is:

1. A function display circuit in an electronic system having a plurality of function parts, said function display circuit comprising:

switching means for selecting a desired function part;

first display means for indicating the selected function part;

second display means for displaying a function of said selected function part; and logic control means comprising a first microcomputer means and a second microcomputer means, said first microcomputer means controlling said second microcomputer means according to said switching means so as to provide a function display signal to said second display means.

2. A function display circuit according to claim 1, wherein said first display means comprises:

a first transistor operating according to the control of said first microcomputer means;

a second transistor operating according to the control of said first microcomputer means and said second microcomputer means; and a three-color LED for selectively emitting each of three colors according to the driving of said first transistor and said second transistor.

3. A function display method for a device having a plurality of function parts, a function selecting switching part, a first display part and a second display part, said function display method comprising the steps of:

determining with logic control means comprising a first microcomputer and a second microcomputer, and with said first microcomputer controlling said second microcomputer according to said function selecting switching part so as to provide a function display signal to said second display part, whether a user has designated a selected function part by using a function decision process comprising conducting a first decision step for deciding if the switching state of said function selecting switching part is for a first function part and if said function selecting switching part is not for said first function part then conducting a second decision step for deciding if the switching state of said function selecting switching part is for one of either a second function part and a third function part;

preventing display of a non-selected function part with a function stop process of said logic control means for stopping said first display part and said second display part from indicating an operating state and the function of said non-selected function part; and displaying said selected function part on a basis of said function display signal, with a function display process for displaying the operating state and the function of said selected function part on said first display part and said second display part, respectively.

4. A function display method according to claim 3, wherein said function stop process comprises:

a function stop routine of said logic control means comprising a step for stopping said second display part from displaying the function of said non-selected function part after said first decision step, a step for putting a controller for said non-selected function part into a standby state, a step for stopping said first display part from displaying the operating state of the unselected function part, and a power supply control step for stopping supply of power to the controller for said non-selected functional part.

5. A function display method according to claim 3, wherein said function display process comprises:

if said selected function part is said first function part, conducting a first function display routine comprising a step for driving said first display part to display the operating state of said first function part and a step for driving said second display part to display the function of said first function part after said function stop routine, if said selected function part is said second function part, conducting a second function display routine comprising a step for driving said first display part to display the operating state of said second function part and a step for driving said second display part to display the function of said second function part after said function stop routine, and if said selected function part is said third function part, conducting a third function display routine comprising a step for driving said first display part to display the operating state of said third function part and a step for driving said second display part to display the function of said third function part after said function stop routine.

6. A display circuit for a device having a plurality of selectable functions, comprising:

means for selecting one of said functions, first display means for indicating the selected function, second display means for displaying an operating condition of said selected function, control means operatively connected to said selecting means and said first display means, comprising a first microcomputer and a second microcomputer, said first microcomputer controlling said second microcomputer according to said switching means so as to provide a function display signal to said first display means for altering said first display means to indicate the identity of said selected one of said functions.

7. A function display circuit according to claim 6, wherein said first display means comprises a single indicator having a plurality of states, each state corresponding to one of said functions.

8. A function display circuit according to claim 7, wherein said control means alters a state of said display means to indicate the identity of said selected function.

9. A function display circuit according to claim 6, wherein:

said second display means comprises a single display for selectively providing operational information corresponding to each of said functions.

10. A function display circuit according to claim 9, wherein:

said control means including means for providing operational information corresponding to said selected function to said second display means.

11. A function display circuit according to claim 1, wherein said second display means is a liquid crystal display.

12. A function display circuit according to claim 1, wherein said electronic system is a component stereo system.

* * * * *